US009501911B2

(12) United States Patent
Sloo et al.

(10) Patent No.: US 9,501,911 B2
(45) Date of Patent: Nov. 22, 2016

(54) AUTOMATIC ILLUMINATING USER INTERFACE DEVICE

(71) Applicant: Google Inc., Mountain View, CA (US)

(72) Inventors: David Hendler Sloo, Menlo Park, CA (US); Jeffrey Alan Boyd, Novato, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 14/586,107

(22) Filed: Dec. 30, 2014

(65) Prior Publication Data

US 2016/0189491 A1  Jun. 30, 2016

(51) Int. Cl.
| | | |
|---|---|---|
| *G08B 21/00* | (2006.01) | |
| *G08B 5/36* | (2006.01) | |
| *G06F 3/0481* | (2013.01) | |
| *H04Q 9/00* | (2006.01) | |

(52) U.S. Cl.
CPC ............ *G08B 5/36* (2013.01); *G06F 3/04817* (2013.01); *H04Q 9/00* (2013.01)

(58) Field of Classification Search
CPC .......... G06F 1/3231; G08B 1/00; G09G 3/34
USPC ....... 340/686.6, 506, 517, 524, 539.23, 541, 340/628, 572.1; 345/168
See application file for complete search history.

(56) References Cited

U.S. PATENT DOCUMENTS

| | | | | |
|---|---|---|---|---|
| 6,107,930 | A * | 8/2000 | Behlke ................. | G08B 13/19 340/3.7 |
| 6,498,600 | B1 * | 12/2002 | Vance .................. | G06F 3/0202 200/5 R |
| 7,255,466 | B2 | 8/2007 | Schmidt et al. | |
| 7,394,451 | B1 | 7/2008 | Patten et al. | |
| 8,026,811 | B2 * | 9/2011 | Sharma ................ | G08B 13/08 235/375 |
| 8,174,483 | B2 * | 5/2012 | Cheng .................. | G06F 1/3203 345/102 |
| 2007/0236360 | A1 | 10/2007 | Fitzgibbon et al. | |
| 2012/0169236 | A1 * | 7/2012 | Kim .................... | H05B 33/0872 315/127 |

OTHER PUBLICATIONS

PCT/US2015/064803, International Search Report and Written Opinion issued in PCT/US2015/064803 on Mar. 24, 2016., p. 10.

* cited by examiner

*Primary Examiner* — Phung Nguyen
(74) *Attorney, Agent, or Firm* — Morris & Kamlay LLP

(57) ABSTRACT

A user interface (UI) device for a premises management system may include at least one proximity sensor, a first interface component configured to illuminate in a first illumination style based on a first rule set when an individual is detected within a first range by the at least one proximity sensor, and a second interface component to receive input from the individual and configured to illuminate in a second illumination style based on a second rule set different from the first rule set when the individual is detected within a second range closer to the UI device than the first range.

23 Claims, 5 Drawing Sheets

AUTOMATIC ILLUMINATING USER INTERFACE DEVICE

BACKGROUND

Some homes today are equipped with smart home networks to provide automated control of devices, appliances and systems, such as heating, ventilation, and air conditioning ("HVAC") system, lighting systems, home theater, entertainment systems, as well as security systems. Smart home networks typically include a control panel that provides a user interface for receiving user input and controlling the various devices, appliances, and security systems in the home. The control panel may include a keypad or a touch screen that the user may use to input, for example, security codes or instructions to set a temperature or arm alarms.

BRIEF SUMMARY

According to an embodiment of the disclosed subject matter, a premises management system is provided that can include inter-connected premises management devices. Each such device can include one or more sensors that generate data about an environment and a user interface (UI) device to provide an interface for a user to interact with and control the system. The UI device can include one or more proximity sensors and a first interface component that can be configured to illuminate when an individual is detected within a first range by the one or more proximity sensors. It can also have a second interface component that can receive input from the individual and be configured to illuminate when the individual is detected within a second range that is closer to the UI device than the first range.

According to an embodiment of the disclosed subject matter, a method of operating a user interface (UI) device for a premises management system can include illuminating a first interface component of a UI device in a first illumination style when an individual is detected within a first range from the UI device. The first illumination style can be selected based on a first rule set. The second interface component of the UI device can be illuminated in a second illumination style when the individual is detected within a second range from the UI device. The second range can be closer than the first range and the second illumination style can be selected based on a second rule set that can be different from the first rule set.

According to an embodiment of the disclosed subject matter, a user interface (UI) device for a premises management system can include at least one proximity sensor, a first interface component configured to illuminate in a first illumination style based on a first rule set when an individual is detected within a first range by the at least one proximity sensor, and a second interface component to receive input from the individual and configured to illuminate in a second illumination style based on a second rule set different from the first rule set when the individual is detected within a second range closer to the UI device than the first range.

According to an embodiment of the disclosed subject matter, means for illuminating a first interface component of a UI device in a first illumination style can be activated when an individual is detected within a first range from the UI device. The first illumination style can be selected based on a first rule set. Means for illuminating a second interface component of the UI device in a second illumination style can be activated when the individual is detected within a second range from the UI device closer than the first range. The second illumination style can be selected based on a second rule set that can be different from the first rule set are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
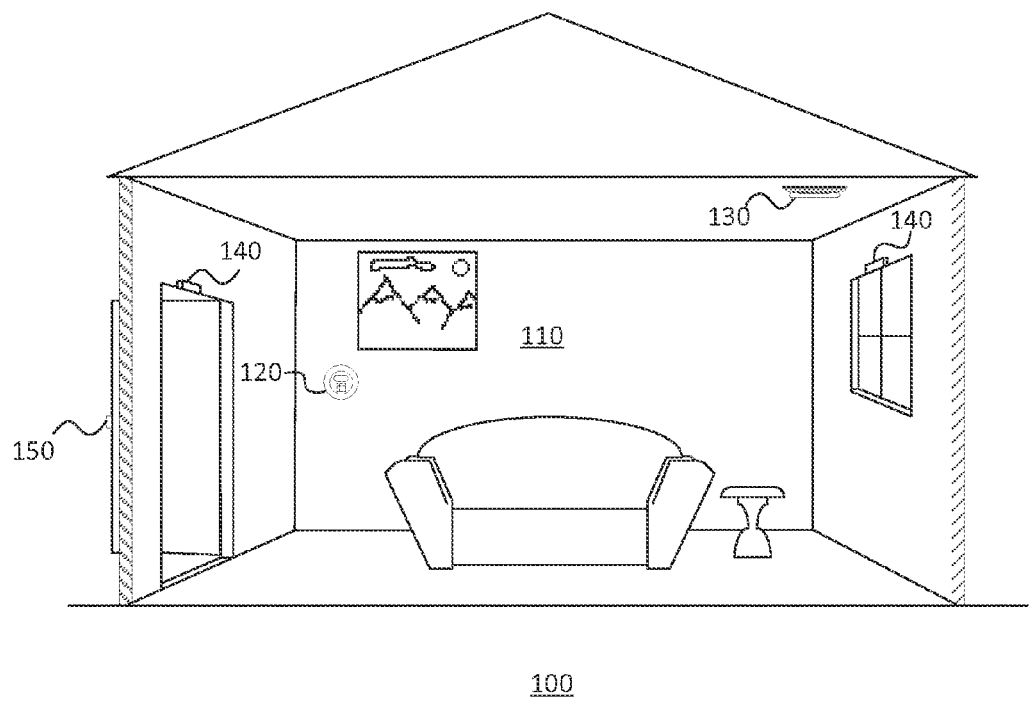
FIG. 1 shows a premises management system according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Embodiments of the present disclosure relate generally to a control panel device including at least one sensor and a dual-component user interface that can illuminate in an intelligent manner according to the circumstances. For example, the sensor can detect an approach of a particular individual and the control panel device can, in response to the detected response, illuminate in a way that is specifically tailored to that individual.

The presently disclosed control panel may control a system that includes a plurality of electrical and/or mechanical components, including intelligent, sensing, network-connected devices that communicate with each other and/or may communicate with a central server or a cloud-computing system to provide any of a variety of management objectives in a home, office, building or the like. Such objectives, which may include, for example, managing alarms, managing installed systems (e.g., sprinkler system, speaker system), controlling room temperature, etc., will collectively be referred to as "premises management." A premises management system as disclosed herein may further include subsystems that communicate with each other to manage different aspects of premises management. For example, a security system component may manage the arming, disarming, and activation of alarms and other security aspects of the premises, and a smart home component may handle environmental aspects such as light, temperature, and hazard detection of the premises.

In such a multi-purpose system, different users may approach the control panel for different reasons. For example, one user may approach intending to enter a security code, another user may approach intending to turn off a sprinkler system, still another user may approach intending to adjust the temperature within the premises, while another user may approach intending to adjust an input source of a speaker system. The presently disclosed control panel may be implemented as an intelligent device that "learns" patterns of use and responds to different individual approaches based on learned information to visually communicate useful information to the approaching individual. In an implementation, such learning may occur only with the consent of the one or more individual users. Such communicated information may be based on data obtained from sensor components incorporated with the control device, sensor components of the premises management system, or from various other components thereof.

Sensors may be installed in the hardware components of the presently disclosed premises management system that are used to monitor and affect the premises in order to carry out premises management. These hardware components will hereinafter be referred to as "premises management devices." The premises management devices described herein include multiple physical hardware and firmware configurations, along with circuitry hardware (e.g., processors, memory, etc.), firmware, and software programming that are capable of carrying out the presently described methods and functions of a premises management system.

FIG. 1 shows an example premises management system 100, installed within a premises 110. The system 100 may include multiple types of premises management devices, such as one or more intelligent, multi-sensing, network-connected control panel devices 120, one or more intelligent, multi-sensing, network-connected hazard detection units 130, one or more intelligent, multi-sensing, network-connected entry detection units 140, and one or more network-connected door handles 150.

In addition to the control panel 120 being a learning device, the system 100 as a whole may be configured to operate as a learning, evolving ecosystem of interconnected devices. New premises management devices may be added, introducing new functionality or expanding existing functionality. Existing premises management devices may be replaced or removed without causing a failure of the system 100. Such removal may encompass intentional or unintentional removal of components from the system 100 by the user, as well as removal by malfunction (e.g., loss of power, destruction by intruder, etc.). In view of the dynamic nature of the system, the overall functionality and objectives of the system 100 may change as the constitution and configuration of the system 100 change.

In order to avoid contention and race conditions among the interconnected devices, certain decisions, such as those that affect the premises management system 100 at a system level or that involve data from multiple sources, may be centralized in a "brain" component. The brain component may coordinate decision making across the system 100 or across a designated portion thereof. The brain component is a system element at which, for example, detector states converge, user interaction is interpreted, sensor data is received and decisions are made concerning the state of the system 100. Hereinafter, the system 100 brain component will be referred to as the "primary system processor." The primary system processor may be implemented in the control panel 120 and/or distributed among one or more premises management devices within the system.

The primary system processor may control subsystems and components of the premises management system, such as, for example, the security component and/or the smart home environment component. Furthermore, the primary system processor may control, receive data from, and transmit data to premises management devices within the system.

In the embodiments disclosed herein, the control panel 120 and each of the premises management devices may include one or more sensors. In general, a "sensor" may refer to any device that can obtain information about its local environment and communicate that information in the form of data that may be stored or accessed by other devices and/or systems. Sensor data may form the basis of inferences drawn about the sensor's environment. For example, the control panel 120 may use data from a plurality of sensors to determine whether an individual has entered the room and whether the individual is approaching the control panel 120 or simply passing by.

A brief description of sensors that may be included in the system 100 follows. The examples provided are not intended to be limiting but are merely provided as illustrative subjects to help facilitate describing the subject matter of the present disclosure. The control panel 120 and system 100 may use data from the types of sensors described below in order to detect the presence and behavior of individuals within the premises, but the present disclosure is not limited to the types of example sensors listed here. Rather, the system 100 may employ data from any type of sensor that provides data from which an inference may be drawn about the environment in or around the premises 100 and the vicinity of the control panel 120. Since it would be impractical to list and describe every type of possible sensor, it should be understood that sensors in general are known in the art and deployment of sensors not specifically described herein will be readily understood by one of ordinary skill on the art.

Generally, sensors may be described by the type of information they collect. For example, sensor types may include motion, smoke, carbon monoxide, proximity, temperature, time, physical orientation, acceleration, location, entry, presence, pressure, light, and sound, sensors and the like. A sensor also may be described in terms of the particular physical device that obtains the environmental information. For example, an accelerometer may obtain acceleration information, and thus may be used as a type of motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof.

A sensor also may be described in terms of a function or functions the sensor performs within the system 100. For example, a sensor may be described as a security sensor when it is used to determine security events, such as unauthorized entry.

A sensor may operate for different functions at different times. For example, system 100 may use data from a motion sensor to determine how to control lighting in the premises 100 when an authorized user is present and use the data to change a system security state on the basis of unauthorized or unexpected movement when no authorized user is present. In another example, the system 100 may use the motion sensor data differently when an alarm system is in an "armed" state versus an "unarmed" state.

In some cases, a sensor may operate as multiple sensor types sequentially or concurrently, such as where a temperature sensor is used to detect a change in temperature, as well as the presence of a person or animal. A sensor also may operate in different modes (e.g., different sensitivity or threshold settings) at the same or different times. For example, a sensor may be configured to operate in one mode during the day and another mode at night. As another example, a sensor may operate in different modes based upon a state of system 100, or as otherwise directed by the primary system processor.

Multiple sensors may be arranged in a single physical housing, such as where a single device includes movement, temperature, magnetic, and/or other sensors. Such a housing may also be referred to as a sensor or a sensor device. For clarity, sensors may be described with respect to the particular functions they perform and/or the particular physical hardware used, when such specification is beneficial for understanding of the embodiments disclosed herein.

Figure 2:
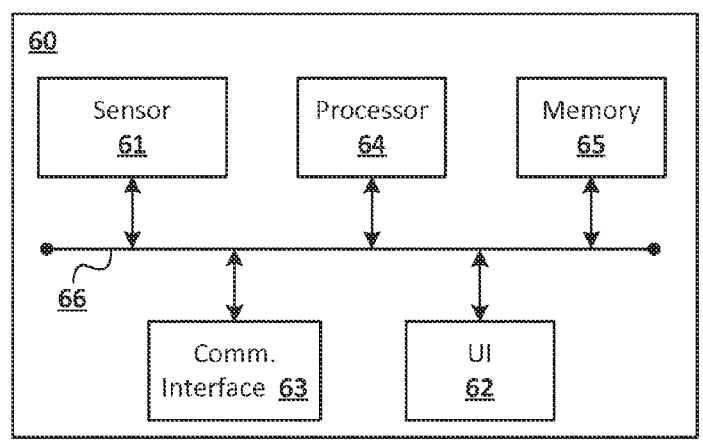
FIG. 2 shows a premises management device according to an embodiment of the disclosed subject matter.

FIG. 2 shows an example premises management device 60 including a sensor 61 as disclosed herein. The sensor 61 may be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass or any other suitable environmental sensor, that obtains or provides a corresponding type of information about the environment in which the premises management device 60 is located. A processor 64 may receive and analyze data obtained by the sensor 61, control operation of other components of the premises management device 60 and/or external devices, and process communication between the premises management device 60 and other devices. The processor 64 may execute instructions and/or computer executable components stored on a computer-readable memory 65. Such computer executable components may include, for example, a primary function component to control a primary function of the premises management device 60 related to managing a premises, a communication component to locate and communicate with other compatible premises management devices, and a computational component to process system related tasks.

The memory 65 or another memory in the premises management device 60 may also store environmental data obtained by the sensor 61. A communication interface 63, such as a WiFi, Thread, or other wireless interface, Ethernet or other local network interface, Bluetooth® or other radio interface, or the like may allow for transmission and receipt of data by the premises management device 60 to and from other devices.

A user interface (UI) 62 may provide information and/or receive input from a user of system 100. The UI 62 may include, for example, a speaker to output an audible alarm when an event is detected by the premises management device 60. Alternatively, or in addition, the UI 62 may include a light to be activated when an event is detected by the premises management device 60. The user interface may be relatively minimal, such as a liquid crystal display (LCD), light-emitting diode (LED) display, or limited-output display, or it may be a full-featured interface such as a touchscreen, keypad, or selection wheel with a click-button mechanism to enter input.

Internal components of the premises management device 60 may transmit and receive data to and from one another via an internal bus 66 or other mechanism, as will be readily understood by one of skill in the art. One or more components may be implemented in a single physical arrangement, such as where multiple components are implemented on a single integrated circuit. Premises management devices 60 as disclosed herein may include other components, and/or may not include all of the illustrative components shown.

As previously mentioned, sensor 61 obtains data about the premises. At least some of the data may be used to distinguishably identify an individual present in the vicinity and to learn their behaviors, as will be described below. Through the bus 66 and/or communication interface 63, sensor data may be transmitted to or accessible by other components of the system 100. Generally, two or more sensors on one or more premises management devices may generate data that can be coordinated by the primary system processor to determine a system response and/or infer an intent of a user. In one example, the primary system processor of the system 100 may detect an entrance and approach of an individual based on data from entry detection sensors and motion sensors and, based on a current state of the system 100, further estimate whether the individual intends to use the control panel 120.

Figure 3:
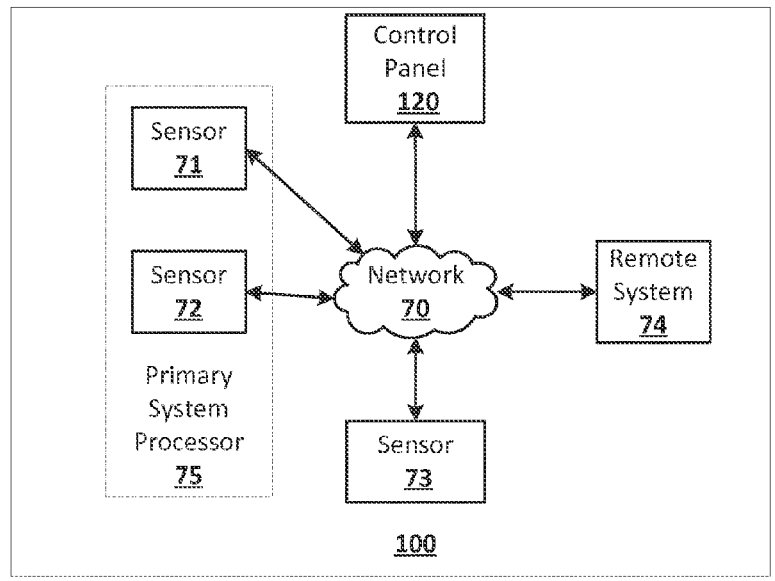
FIG. 3 shows a system according to an embodiment of the disclosed subject matter.

FIG. 3 shows a diagram example of a premises management system 100 which may include an intelligent control panel 120 as disclosed herein. System 100 may be implemented over any suitable wired and/or wireless communication networks. One or more premises management devices, i.e., sensors 71, 72, 73, and one or more control panels 120 (e.g., control panel 120 as shown in FIG. 1) may communicate via a local network 70, such as a WiFi or other suitable network, with each other. The network 70 may include a mesh-type network such as Thread, which provides network architecture and/or protocols for devices to communicate with one another. A user may therefore interact with the premises management system 100, for example, using the control panel 120 which communicates with the rest of the system 100 via network 70.

The control panel 120 and/or one or more of the sensors 71, 72, 73, may be configured to implement a primary system processor 75. The primary system processor 75 may, for example, receive, aggregate, and/or analyze environmental information received from the sensors 71, 72, 73, and the control panel 120. Furthermore, a portion or percentage of the primary system processor 75 may be implemented in a remote system 74, such as a cloud-based reporting and/or analysis system.

The sensors 71, 72, 73, may be disposed locally to one another, such as within a single dwelling, office space, building, room, or the like, or they may be disposed remote from each other, such as at various locations around a wide perimeter of a premises. In some embodiments sensors 71, 72, 73, may communicate directly with one or more remote systems 74. The remote system 74 may, for example, aggregate data from multiple locations, provide instruction, software updates, and/or aggregated data to the primary system processor 75, control panel 120, and/or sensors 71, 72, 73. In addition, remote system 74 may refer to a system or subsystem that is a part of a third party monitoring service or a law enforcement service.

The premises management system shown in FIG. 3 may be a part of a smart-home environment. The smart-home environment may include a structure, such as a house, office building, garage, mobile home, or the like. The devices of the smart home environment, such as the sensors 71, 72, 73, and the network 70 may be integrated into a smart-home environment that does not include an entire structure, such as a single unit in an apartment building, condominium building, or office building.

As described above, the smart home environment can control and/or be coupled to devices both inside and outside of the premises structure. For example, one or more of the sensors 71, 72, 73, may be located outside the structure at one or more distances from the structure (e.g., sensors 71, 72, may be disposed at points along an extended driveway or land perimeter on which the structure is located, and the like). Likewise, the primary system processor 75 may be implemented in sensors located outside of the structure. The control panel 120 may also be implemented as a device integrated within the structure or as a free-standing device independent of the structure which the user may carry within or outside of the structure.

The structure of the smart-home environment may include a plurality of rooms, separated at least partly from each other via walls. Each room can further include a floor and a ceiling. Devices of the smart-home environment, such as the sensors 71, 72, 73, may be mounted on, integrated with and/or supported by a wall, floor, or ceiling of the structure.

Figure 4:
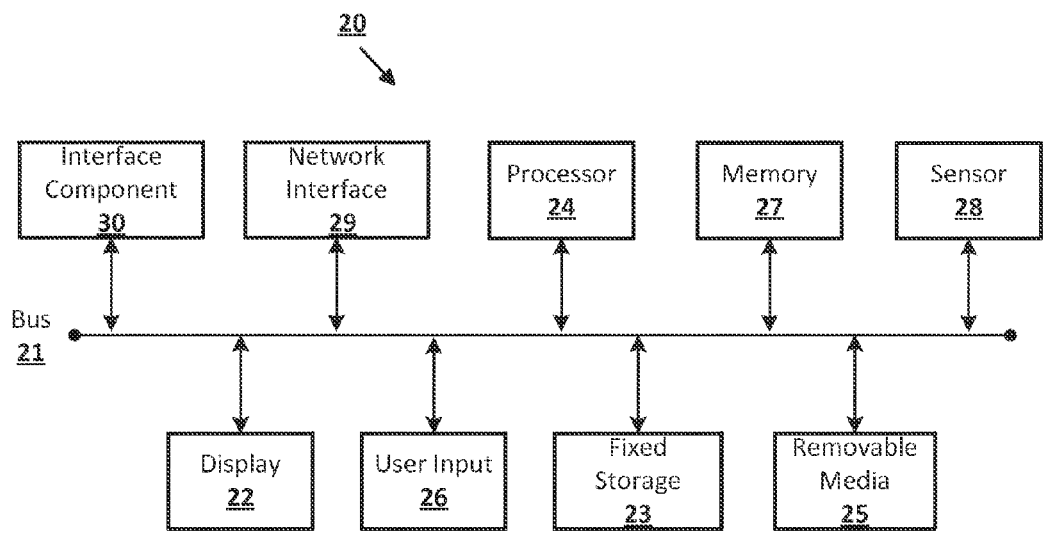
FIG. 4 shows a computing device according to an embodiment of the disclosed subject matter.

FIG. 4 shows an example computing device 20 suitable for implementing certain elements that are apart of embodiments of the presently disclosed subject matter. The computing device 20 may be used to implement, for example, the control panel 120 or a premises management device including sensors as disclosed above. The computing device 20 may be constructed as a custom-designed device or may be, for example, a special-purpose desktop computer, laptop computer, or mobile computing device such as a smart phone, tablet, or the like.

The computing device 20 may include a bus 21 that interconnects major components of the computing device 20, such as a central processor 24, a memory 27 such as Random Access Memory (RAM), Read Only Memory (ROM), flash RAM, or the like, a sensor 28, which may include one or more sensors as previously discussed herein, a user display 22 such as a display screen, a user input interface 26, which may include one or more user input devices such as a keyboard, mouse, keypad, touch screen, turn-wheel, and the like, a fixed storage 23 such as a hard drive, flash storage, and the like. The user input interface 26 may include a backlit or illumination component to provide light through the user input interface 26. The computing device 20 may further include a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computing device 20 are generally stored on and accessed via a computer readable storage medium.

The fixed storage 23 may be integral with the computing device 20 or may be separate and accessed through other interfaces. The network interface 29 may provide a direct connection to the premises management system and/or a remote server via a wired or wireless connection. The network interface 29 may provide such connection using any suitable technique and protocol as will be readily understood by one of skill in the art, including digital cellular telephone, WiFi, Thread, Bluetooth®, near-field, and the like. For example, the network interface 29 may allow the computing device 20 to communicate with other components of the premises management system, other computers via one or more local, wide-area, or other communication networks, as described in further detail herein.

Referring to FIGS. 3 and 4, as mentioned above, computing device 20 may be used to implement a control panel 120 of the system 100. In an implementation such as a control panel 120, the computing device 20 may include one or more sensors 28 to detect the presence and/or movements of an individual in the vicinity with respect to the control panel 120. Based on data from the sensors 28 and the sensors 71, 72, 73, the control panel 120 may intelligently communicate information to the individual.

Figure 5:
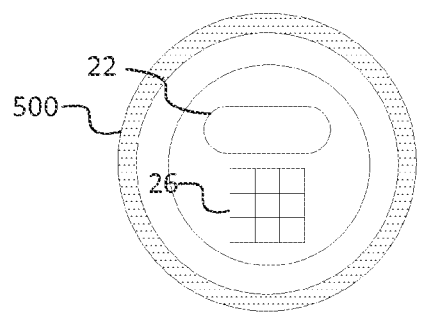
FIGS. 5-7 show example embodiments of a control panel according to an embodiment of the disclosed subject matter.
Figure 6:
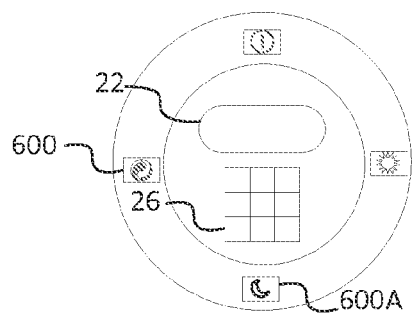
Figure 7:
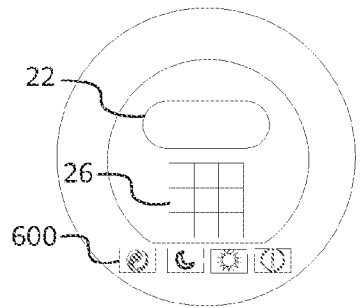

The computing device 20 may include an interface component 30. The interface component 30 may include an illuminating element, such as one or more LED's, optical fibers, or other devices capable of producing and/or conveying light, or one or more translucent buttons which may be illuminated. The interface component 30 may be formed in different configurations. FIGS. 5-7 show various example configurations, however, these are merely examples provided for illustrative purposes and the present disclosure is not limited to these configurations. A person of ordinary skill in the art will understand that other configurations are possible within the scope of the present disclosure.

FIG. 5 shows a configuration in which the interface component 30 completely encircles user input 26 and display 22. In this configuration, interface component 30 is implemented as a light ring 500 disposed around an outer circumference of the control panel 120. The light ring may be configured to selectively illuminate any of a plurality of colors, as will further be described below.

FIG. 6 shows another configuration of the interface component 30. In this configuration, interface component 30 is implemented as one or more buttons 600 disposed in a circular layout on a front face of the control panel 120 encircling user input 26 and display 22. The buttons 600 may be configured to selectively illuminate any of a plurality of colors, and may also be configured to display one or more icons. For example, the icons could represent modes or commands and may be imprinted on the face of the buttons 600.

FIG. 7 shows another configuration of the interface component 30 including the buttons 600. In this configuration, the buttons 600 are disposed along a line on one edge of the control panel 120. Generally, the buttons 600 may be disposed in any layout format on the control panel 120.

Referring back to FIGS. 3 and 4, the control panel 120 may control an illumination style of the interface component 30 and the user input 26 based on data obtained from one or more sensors 28 and/or sensors 71, 72, 73 according to at least partly different sets of rules. Sensor 28 may include an ambient light sensor, motion sensor, proximity sensor, PIR sensor, microphone, or the like. When the sensor 28 detects an individual's approach within a first distance range of the control panel 120, the control panel 120 may illuminate the first interface component 30 according to a first set of rules. This operational phase may be referred to as the "notification phase."

The rules applied during the notification phase may depend upon the type and amount of data that is available in the system 100 and upon the specific sensor 28 configuration of the control panel 120. Various configurations and rules will be described below, however, the present disclosure is not limited to any particular combination thereof. Rather, a person of ordinary skill in the art will recognize that multiple permutations including some not specifically described will fall within the scope of the present disclosure.

Figure 8:
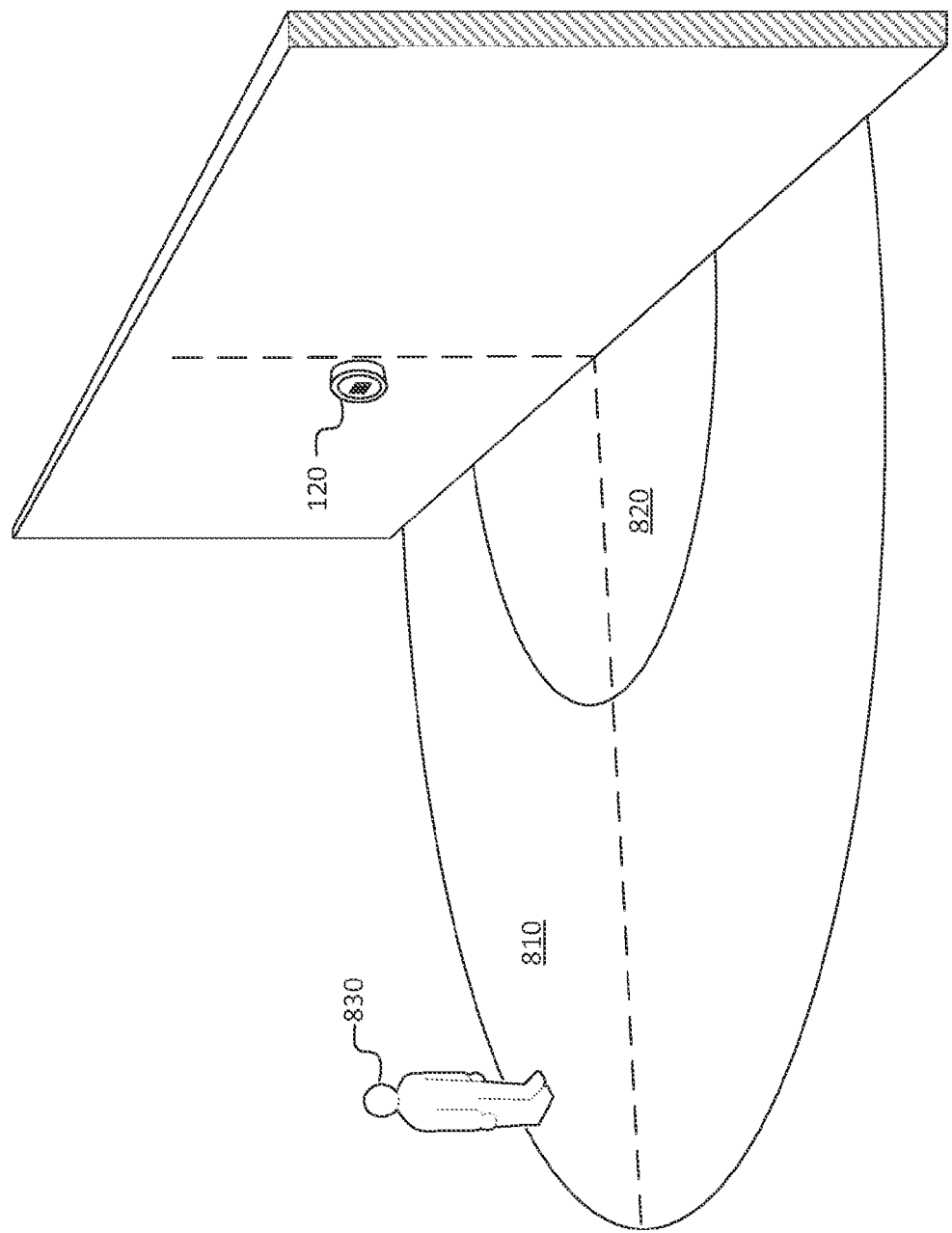
FIG. 8 shows an example of a first and second range from a control panel according to an embodiment of the disclosed subject matter.

FIG. 8 shows an individual 830 approaching a control panel 120. In one embodiment, the sensors 28 of the control panel 120 may include at least a proximity sensor configured to detect an individual 830 at a first distance range 810. Upon detection of the individual 830 within first range 810, the control panel 120 may illuminate the interface component 30 (FIG. 4) in a first style (e.g., color, intensity, pulsation, etc.). Selection of the parameters of the first illumination style may depend on one or more factors, including environmental factors, e.g., a time of day, a condition of the room in which the control panel 120 is situated), system factors (e.g., a state of the system 100 which the control panel 120 operates) and subject factors (e.g., an identification of the subject individual 830 who has been detected).

Regarding environmental factors, the sensors 28 may further include an ambient light sensor, a microphone, atmosphere detector, thermometer, or other types of sensors that may obtain data about the local environment around the control panel 120. The control panel 120 may select a color and intensity of illumination based on the environment data. For example, if the room is dark, the control panel 120 may select a softer, dimmer color light for illumination, whereas if the room is bright the control panel 120 may select a sharper, brighter light for illumination. In another example, the control panel 120 may select a color from among a gradient of colors corresponding to various temperatures detected in the room, e.g., if the room is warm the control panel 120 may select an orange color whereas if the room is cool the control panel 120 may select a blue color. In another example, the control panel 120 may illuminate the interface component 30 to complement a sound, such as music presently playing in the room. In this example, the interface component 30 may be controlled to pulse in sync to the rhythm of the music. These examples are not exclusive, but may be combined in any number of ways. For example, in a dim, cool, room playing music the control panel 120 may control the interface component to illuminate a soft, blue color pulsing rhythmically to the beat of the music.

In other situations, the interface may be configured to produce sound at a given volume to overcome and be heard over ambient noise in a room or when illumination may be ineffective, e.g., when the ambient light levels in a room are very high and it would be hard for a user to distinguish lighting variations on the interface.

Regarding system factors, the control panel 120 may obtain information about the system and communicate such information in a color-coded transmission via the interface component 30. For example, the control panel 120 may obtain data about a security state of the premises and illuminate the interface component 30 to communicate the present state, e.g., illuminate a green color to indicate that all is well, a yellow color to indicate that a possible alert situation has occurred, and a flashing red color to indicate that the system is in an alert mode. In other examples, the control panel 120 may communicate color-coded information such as an alarm mode (e.g., unarmed, away, stay, etc.), whether any occupants are home, or whether the certain system components are presently functioning. Such color-codes may be predefined by the system 100 or may be defined/adjusted by the user of the system 100.

Furthermore, the control panel 120 may obtain data from sensors 71, 72, 73 in the system 100 and select a color to communicate information inferred from the sensor data. For example, referring to FIG. 1, if a hazard detection device 130 elsewhere within the premises 110 detects a hazardous gas in the atmosphere, the control panel 120 may illuminate a flashing yellow color to indicate a warning.

In addition to color selection, in the embodiments as shown in FIG. 6, the control panel 120 may selectively highlight one or more buttons 600. For example, the buttons 600 may include icons that represent commands, modes, or input shortcuts to the control panel 600. The buttons can be illuminated on an individual 830 basis to further communicate information during the notification phase. As such, it is possible to communicate dual information. For example, the buttons may include an icon 600A that indicates a "night" alarm mode, i.e., a mode in which a breech detected by perimeter and entry way sensors will trigger an alert but movement detected by indoor motion sensors will not trigger an alert. When an individual 830 enters the first distance range 810, the control panel 120 may illuminate all of the buttons 600 a soft orange color to indicate the temperature, but illuminate the night mode button 600A relatively more intensely than the other buttons 600 to indicate that the security system component of system 100 is presently set to night mode. Therefore, at a glance while walking past the control panel 120 the user may be apprised of several pieces of information.

In another example, the control panel 120 may illuminate one or more buttons 600 more intensely than the other buttons 600 in order to indicate to the individual 830 certain options that are presently available for selection or to suggest preferred options that should be selected by the user out of all of the options that are available. For example, the system 100 may be configured not to automatically contact the fire department, but rather to require a button-press from a user to contact the authorities. This may be implemented in situations where a person at the premises can investigate, say, a fire indication provided by the system and confirm whether there is or is not a fire at the premises before the system 100 contacts the fire department. The interface can provide a button that the user can push to indicate that there is no emergency and another button to indicate that there is an emergency and to cause the system 100 to contact emergency services. The system 100 may determine that there may be a hazard such as a fire or a natural gas leak based upon data received from various sensors. The system 100 may also determine a confidence level corresponding to the determination. The confidence level can correspond to the likelihood that a hazard actually exists based on the amount of data received by the system 100 regarding the potential hazard and the consistency of such data that indicates the possibility of the hazard. If the confidence level exceeds a given high confidence threshold, then the system 100 may cause the "contact emergency services" button to flash, be colored more intensely (e.g., show a brighter red) and/or be accompanied with an audio signal, such as a beeping. If the confidence level is below the given high confidence threshold but above a given low confidence threshold, it may cause both the "contact emergency services" and "false alarm" buttons to be displayed in approximately the same fashion. If the confidence level is below a low confidence threshold, it may cause the "false alarm" button to flash.

Regarding subject individual factors, the control panel 120 may obtain information about the subject individual 830 and provide information customized for the individual 830. The selection of customized information may be set by direct user input or determined by the control panel 120 "learning" what information the subject individual 830 is most likely to desire to receive. In an implementation, such learning may only occur based on a user's consent. For example, the system 100 may learn that a given user is blind and use alternative audio alerts rather than illuminated alerts. Likewise, if a user is known to be deaf, enhanced visual outputs may be generated and shown without a sound component when the user approaches. As another example, a user known to be a system administrator or adult may be shown more options in a more complicated layout than a user known to be a child. For example, a system administrator may be presented with interface elements that can be used to reset the system or to change the system 100 security mode, e.g., from "home" to "away", while these may not be shown to other users who are not administrators. An adult may be shown interface elements with options to contact emergency services, while a child may be shown interface elements that, when selected, alert the child's parents via an audible alarm (e.g., in the bedroom or a general announcement throughout the premises) or by sending a text message or telephone call to the parents' smartphones.

In the direct user input method, the individual 830 may register an account with the control panel 120, for example, via the user input 26 (FIG. 4) or via a connection to the control panel 120 through network 70 (FIG. 3) using a computer, laptop, notebook, tablet, mobile device or the like. The individual 830 may associate, with the registered account, personal preferences regarding which information the control panel 120 should transmit during the notification phase. For example, the individual 830 may designate a preference for the control panel 120 to communicate a security state of the premises, or a preference for the control panel 120 to communicate a temperature of the room, or a preference for the control panel 120 to simply display a favorite color of the individual 830 or a color which matches the room in accordance with the individual's 830 visual liking. In this embodiment the individual 830 may experience a subtle pleasure in seeing elements of the individual's 830 smart home environment respond to the individual's 830 presence with pleasing visual effects.

The control panel 120 may recognize or attempt to recognize the subject individual 830 in one or more of several different ways. For example, the sensor 28 may include a camera which may detect the individual 830 and identify the individual 830 based on facial recognition methods. In another example, the individual 830 may carry a device such as a small key fob that identifies the individual 830 to the control panel 120 and/or the system 100. The key fob may include a radio frequency identification (RFID) device that may identify the individual 830 to the control panel 120. In yet another example, the individual 830 may register the individual's 830 mobile device with the control panel 120. When the mobile device comes in range, the mobile device may identify the individual 830 to the control panel 120 via wireless communication protocols, e.g., Bluetooth®, Thread, WiFi, or via the network 70. In yet another embodiment, the system 100 may identify an individual 830 based on learned features and patterns, such as the height and cross section of the person, a signature based on the manner in which the person approaches the control panel 120 (speed, direction, etc.), the times of day that the user approaches and so on, or any combination thereof. In another embodiment, the control panel 120 can ask a user to identify itself by providing interface elements (e.g., buttons) each labeled with the name of a known occupant of the premises and asking the user to select the element corresponding to the user's identity. The selection can be verified biometrically, by reading a fingerprint of the user that can be detected when the user touches the screen to make the selection. The selection may also be verified by subsequently asking the user to enter a secret known only to the user, such as a PIN.

In another embodiment, the control panel 120 may use categorical responses to determine the information or effect to be communicated via color selection. For example, the control panel 120 may be set to operate according to a set of preferences when in a certain room (e.g., in the master bedroom, illuminate security information according to the security color-codes; in the basement, illuminate temperature color-codes and pulse when music is playing, etc.). Other categorical responses may include a set of preferences according to a certain time of the day, certain day of the week, certain calendar day (e.g., shades of red on Valentine's day, etc.) or other categorical-type setting.

Furthermore, even if the individual 830 does not register with the control panel 120, the control panel 120 may still attempt to "learn" the individual's 830 preference based on the most frequent uses the control panel 120 encounters during the next phase, as will now be described as follows.

Referring to FIGS. 8 and 4, as a response to the individual 830 approaching toward the bounds of a second distance range 820, the control panel 120 may gradually increase the intensity of illumination of the first component 30. When the sensor 28 detects the individual 830 is within the second distance range 820 of the control panel 120, which is closer than the first distance range 810, the control panel 120 may illuminate or not illuminate the user input 26 (e.g., keypad, touch screen, click wheel, etc.) according to a second set of rules. This operational phase may be referred to as the "approach phase."

During the notification phase, while the individual 830 is in the first range 810 the user input 26 may remain dormant at a default illumination level or completely off. For example, in the embodiment of FIG. 6, the individual 830 will not be distracted or overwhelmed by the user input 26 during the notification phase, but the individual's 830 attention may be directed to the color of the buttons 600 and particularly the highlighted button 600A. However, as the individual 830 approaches closer, the control panel 120 may infer that the individual 830 intends to interact with the control panel 120 and not simply receive visual information. Accordingly, the control panel 120 may illuminate or not illuminate the user input 26 based on the second set of rules.

When the individual 830 arrives within the second range 820, the control panel 120 may illuminate the user input 26 according to a second illumination style. As the individual 830 approaches closer to the control panel 120, the control panel 120 may increase the intensity of illumination of the user input 26. These actions may signify to the individual 830 that the control panel 120 is ready to receive input.

If the individual 830 has been identified by the control panel 120 during the notification phase, the control panel 120 may operate the user input 26 to display information in accordance with the preferences of the individual 830 as previously set by the individual 830 or as learned by the control panel 120. For example, in one embodiment the user input 26 may be implemented as a touch screen. In this embodiment, the screen may display a screen with additional information or controls, such as virtual sliders to control settings of a particular component of the system 100 (e.g., an entertainment system control display, a sprinkler system control display, a security system control display, etc.), an alpha-numeric keypad to enter settings, or other types of displays.

In another example, the control panel 120 may remain off or present a restricted set of interface elements if the identified individual 830 is not authorized to operate the control panel 120, if the individual 830 is not identified or if the individual 830 (such as a child or a service provider) is only authorized access to a restricted set of system 100 controls.

Moreover, the user input 26 may restrict certain displays to certain individuals. For example, certain security settings may be restricted from being displayed except to the adult owner of the home. In restricting certain displays, the control panel 120 may require authentication of a user before showing the restricted display, such as entering a code as well as being otherwise identified by the control panel (i.e., via facial recognition, key fob, mobile device, etc.). In this case, the control panel 120 may identify a potentially authorized individual approaching and automatically display a keypad mode on user display 26 when the individual 830 enters the second range 820 for the individual 830 to complete his/her authentication to the control panel 120.

In one embodiment, the control panel 120 may lack any devices or methods by which to attempt to identify the approaching individual 830. In this case, the control panel 120 may simply illuminate the user input 26 (keypad) or display a general input screen on a touch screen. If the individual interacts with the control panel 120, however, the control panel 120 may record data indicating a nature of the interaction. Such data may be stored, for example in memory 27, fixed storage 23 or removable media 25. Based on this data, the control panel 120 may detect use trends and attempt to operate in a manner that anticipates a likely use of the control panel 120 by the individual 830. For example, the stored data may indicate that every weekday at 5:00 the control panel 120 is used to adjust the temperature of system 100. Accordingly, when the control panel 120 detects an individual within the second range 820 at 5:00 on a weekday, the control panel 120 may illuminate the user input 26 to display temperature control settings.

Figure 9:
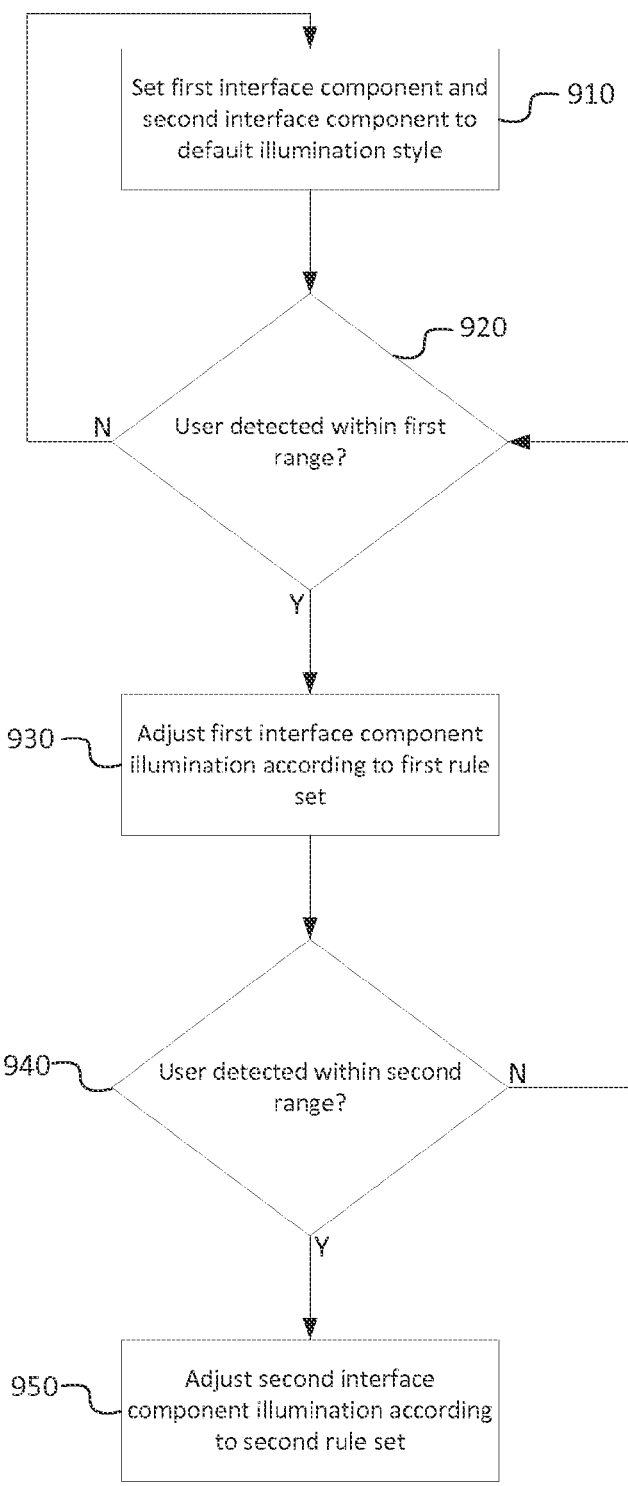
FIG. 9 shows a flowchart of a method of operating a control panel according to an embodiment of the disclosed subject matter.

FIG. 9 shows a flowchart of a method of operation for control panel 120. At operation 910, the control panel sets the interface component 30 and the user input 26 to a default style, for example, a low level or an off level. At operation 920 the control panel 120 determines whether an individual is within the first distance range. If no individual is detected, the control panel 120 maintains the interface component 30 and the user input 26 at the default illumination style.

If an individual is detected at operation 920, the control panel 120 can adjust the interface component 30 in accordance with a first rule set at operation 930. The first rule set may define, for example, a color and/or brightness selection for illumination based on, for example, sensor data indicating a temperature of a room, an operation status or state of the system 100, sensor data from other sensors 71, 72, 73 of the system 100, a personal preference of an identified individual, a categorical setting of the control panel 120. Accordingly, a rule set could define a color for each degree within a range of degrees, or define a color for each of a plurality of operational states of the system 100, etc. For example, at operation 920 the control panel may select the illumination style according to the following rules: security state "all clear"=constant green; security state "warning"=pulsing yellow; security state "alert"=flashing red. Furthermore, rules created from various bases may be combined into a single rule set, as in the case of rules regarding temperature, ambient light, and music and one or more announcements all being combined to determine the selected illumination style.

At operation 940 the control panel 120 determines whether an individual is within the second distance range. If no individual is detected, the control panel 120 determines whether an individual is still in first detected range at operation 920. If an individual is detected within the second range, then the control panel 120 adjusts an illumination style of the user input 26 (second interface component) in accordance with a second rule set. The second rule set may define a display screen or key pad illumination style based on, for example, an identification of the user, a estimation of intended use of the control panel 120 as determined by historical data, a default display mode, or other rule.

In an implementation, the system may detect and identify a user in the first range. The system 100 may determine if it requires any input from the identified person. For example, the system 100 may identify a user passing by the control panel 120 as a system administrator and may also determine that, in accordance with system rules, the system administrator should be alerted when a system fault is detected. Examples of a system fault include an inoperative sensor, a blocked sensor, a problem with a communications channel (e.g., one that connects the system 100 to emergency services providers), a computer problem and the like. If the system 100 detects a system flat at the time the system administrator is detected to be approaching or passing by in the first range, the system 100 can cause the control panel 120 to illuminate and/or generate a sound signal that effectively summons the administrator to the control panel 120 to give the needed attention to the system 100. This can be implemented based on other conditions besides system faults. For example, the administrator or other user may be summoned when the garage door has been determined by the system 100 to have remained open after 10 PM. In an implementation, if no need is determined by the system 100, the control panel 120 may generate no summons when a user is detected within the first range.

As mentioned above, the control panel 120 may select an illumination style for the first interface component based at least in part on data be obtained from sensors 71, 72, 73, shown in FIG. 3 which may be included in a plurality of devices, including intelligent, multi-sensing, network-connected devices, 111 addition to providing data about the environment, such devices can integrate seamlessly with each other and with a central processor (e.g., primary system processor 75) and/or a cloud-computing system (e.g., remote system 74) to provide general home-security and features of a smart-home environment.

The control panel 120 may be a control hub for a smart-home environment that may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). Data obtained by such devices may also be used by the control panel 120. Various example aspects of a smart-home environment and its interaction with the presently disclosed control panel 120 will now be described.

For example, data may be obtained from a smart doorbell that may control doorbell functionality, detect a person's approach to or departure from a location (e.g., an outer door to the structure), and announce a person's approach or departure from the structure via audible and/or visual message that is output by a speaker and/or a display coupled to, for example, the control panel 120.

As another example, data may be obtained from a smart thermostat that may detect ambient climate characteristics (e.g., temperature and/or humidity) as well as control an HVAC (heating, ventilating, and air conditioning) system accordingly of the structure.

As another example, data may be obtained from a smart hazard detector that may detect the presence of a hazardous substance or a substance indicative of a hazardous substance (e.g., smoke, fire, or carbon monoxide).

In embodiments of the disclosed subject matter, a system 100 may include one or more intelligent, multi-sensing, network-connected entry detectors (e.g., "smart entry detectors"). Such detectors may be or include one or more of the sensors 71, 72, 73, shown in FIG. 3. The illustrated smart entry detectors (e.g., sensors 71, 72, 73) may be disposed at one or more windows, doors, and other entry points of the smart-home environment for detecting when a window, door, or other entry point is opened, broken, breached, and/or compromised. Data may be obtained from such smart entry detectors and used, for example, to detect entry into the vicinity of the control panel 120.

In some embodiments, the premises management system 100 shown in FIG. 3 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72, 73, shown in FIG. 3. Thus, data may be obtained from a smart wall switch that may detect ambient lighting conditions for a primary function of controlling a power and/or dim state of one or more lights. For example, a sensor such as sensors 71, 72, 73, may detect ambient lighting conditions, and a device such as the control panel 120 may control the power to one or more lights (not shown) in the smart-home environment. The control panel 120 may further determine an appropriate intensity of illumination of the interface component 30 based in part on the detected ambient lighting conditions.

Data may also be obtained from smart wall switches that may also control a power state or speed of a fan, such as a ceiling fan. For example, sensors 71, 72, 73, may detect the power and/or speed of a fan, and the control panel 120 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

The smart-home environment of the sensor network shown in FIG. 3 can include one or more intelligent, multi-sensing, network-connected doorknobs (e.g., "smart doorknob"). For example, the sensors 71, 72, 73, may be coupled to a doorknob of a door (e.g., doorknobs 122 located on external doors of the structure of the smart-home environment). However, it should be appreciated that smart doorknobs can be provided on external and/or internal doors of the smart-home environment. Data about the status of the doorknobs may be obtained and combined with other data to infer a state of a room or the premises.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72, 73, of FIG. 3) can be communicatively coupled to each other via the network 70, and to the control panel 120 and/or remote system 74 to provide security, safety, and/or comfort for the smart home environment.

The system 100 may obtain data from one or more of the network-connected smart devices, however, the user also may interact with such devices (e.g., via the network 70). For example, a user can communicate using a computing device 20 (e.g., in the form of control panel 120), a portable electronic device (e.g., a smartphone, a tablet, a key FOB, or the like), or a computer (e.g., a desktop computer, laptop computer, tablet, or the like). A webpage or application can be configured to receive communications from the user and control the one or more of the network-connected smart devices based on the communications and/or to present information about the device's operation to the user. For example, the user can view, arm or disarm the security system of the home via the control panel 120 or other devices listed above. Similarly, the user may also access a report of the sensor data. The system 100 may provide control functions related to the sensor data, for example, to limit the length of time sensor data is stored, to clear caches for privacy concerns, or to disable the storing of data.

Furthermore, more than one user may control one or more of the network-connected smart devices in the smart-home environment using a network-connected computer or portable electronic device. In some examples, as mentioned above, some or all of the users (e.g., individuals 830 who live in the home) can register their mobile device and/or key fobs with the smart-home environment. Such registration can be made via the control panel 120, a computer in communication with the system 100, and/or a central server such as the remote system 74. Registration may be used to authenticate the users and/or their electronic devices as being associated with the smart-home environment, and to provide permission to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals 830 live in the home and are therefore users and which electronic devices are associated with those individuals 830. The smart-home environment may "learn" who is a user (e.g., an authorized individual 830) and permit the electronic devices associated with those individuals 830 to control the network-connected smart devices of the smart-home environment (e.g., devices communicatively coupled to the network 70). In this embodiment, various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols. The learning and messaging features may be subject to the users' prior consent before they are implemented.

The smart-home environment may include communication with devices outside of the smart-home environment but within a proximate geographical range of the home. For example, the smart-home environment may include an outdoor lighting system (not shown) that communicates information through the communication network 70 or directly to the system 100 or a cloud-computing system (e.g., remote system 74) regarding detected movement and/or presence of people, animals, and any other objects and receives back commands for controlling the lighting accordingly.

In some configurations, a remote system 74 may aggregate data from multiple locations, such as multiple buildings, multi-resident buildings, individual residences within a neighborhood, multiple neighborhoods, and the like. In general, sensors 71, 72, 73, and/or control panel 120 as previously described with respect to FIG. 3 may provide information to the remote system 74. The system 100 may provide data directly from one or more sensors as previously described, or the data may be aggregated and/or analyzed by local controllers such as the primary system processor 75, which then communicates with the remote system 74. The remote system 74 may aggregate and analyze the data from multiple locations, and may provide aggregate results to each location. For example, the remote system 74 may examine larger regions for common sensor data or trends in sensor data, and provide information on the identified commonality or environmental data trends to each local system 100.

In situations in which the systems discussed here collect personal information about users, or may make use of personal information, the users may be provided with an opportunity to control whether programs or features collect user information e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treat-d so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A premises management system, comprising:
a plurality of inter-connected premises management devices, each including one or more sensors that generate data about an environment; and
a user interface (UI) device to provide an interface for a user to interact with the system and control one or more of the premises management devices, the UI device including:
one or more proximity sensors,
a first interface component configured to illuminate when an individual is detected within a first range by the one or more proximity sensors, and
a second interface component to receive input from the individual and configured to illuminate when the individual is detected within a second range closer to the UI device than the first range,
wherein the UI device illuminates the first interface component according to a first rule set and illuminates the second interface component according to a second rule set that is different from the first rule set,
wherein the first and second rule sets each define conditions for illumination and styles of illumination that correspond to the conditions.

2. The premises management system of claim 1, wherein the first interface component is configured to increase an intensity of illumination as the individual moves closer to the UI device and to decrease the intensity of illumination as the individual moves away from the UI device.

3. The premises management system of claim 1, wherein the first interface component comprises a plurality of icons disposed around the second interface component.

4. The premises management system of claim 3, wherein the plurality of icons are configured to illuminate on an individual basis according to a present security state of the system when the individual is detected within the first range.

5. The premises management system of claim 1, wherein the first interface component comprises a light ring encircling the second interface component.

6. The premises management system of claim 5, wherein the light ring is configured to illuminate a predetermined color based on a present security state of the system when the individual is detected within the first range.

7. The premises management system of claim 1, wherein the second interface component is a keypad to receive a security code from the individual.

8. The premises management system of claim 1, wherein the second interface component is a touch screen configured to display a plurality of display interfaces including a keypad display to receive a security code.

9. The premises management system of claim 1, wherein the UI device further includes a communication unit to receive an identification signal from the individual.

10. The premises management system of claim 9, wherein the second interface component is a touch screen configured to display a predetermined set of display screens based on the identification signal of the individual.

11. The premises management system of claim 9, wherein the first interface component is a light ring configured to illuminate a predetermined color based on the identification signal of the individual.

12. The premises management system of claim 9, wherein the individual transmits the identification signal using a radio-frequency identification (RFID) device.

13. The premises management system of claim 12, wherein the second interface component is configured to require an authorized identification signal from the RFID device prior to accepting entry of a security code.

14. The premises management system of claim 1, wherein the first interface component is a light ring configured to illuminate a predetermined color based on an identity of an individual.

15. The premises management system of claim 1, wherein each of the styles define at least a color and intensity level of illumination.

16. A method of operating a user interface (UI) device for a premises management system, comprising:
    illuminating a first interface component of a UI device in a first illumination style when an individual is detected within a first range from the UI device, wherein the first illumination style is selected based on a first rule set; and
    illuminating a second interface component of the UI device in a second illumination style when the individual is detected within a second range from the UI device closer than the first range, wherein the second illumination style is selected based on a second rule set different from the first rule set,
    wherein the first and second rule sets each define conditions for illumination and styles of illumination that correspond to the conditions.

17. The method of claim 16, further comprising increasing an intensity of illumination of the first interface component as the individual moves closer to the UI device and decreasing an intensity of the UI device as the individual moves away from the UI device.

18. The method of claim 16, wherein the first interface component comprises a plurality of icons disposed around the second interface component, the method further comprising:
    illuminating the icons on an individual basis according to a present security state of the system when the individual is detected within the first range.

19. The method of claim 16, wherein the first interface component comprises a light ring encircling the second interface component, the method further comprising:
    illuminating the light ring a predetermined color based on a present security state of the system when the individual is detected within the first range.

20. The method of claim 16, wherein the second interface component is a touch screen, the method further comprising:
    receiving an identification signal from the individual; and
    displaying a predetermined set of display screens on the touch screen based on the identification signal of the individual.

21. The method of claim 16, wherein the first interface component is a light ring encircling the second interface component, the method further comprising:
    receiving an identification signal from the individual; and
    illuminating the light ring a predetermined color based on the identification signal from the individual.

22. A user interface (UI) device for a premises management system, the UI device comprising:
    at least one proximity sensor;
    a first interface component configured to illuminate in a first illumination style based on a first rule set when an individual is detected within a first range by the at least one proximity sensor; and
    a second interface component to receive input from the individual and configured to illuminate in a second illumination style based on a second rule set different from the first rule set when the individual is detected within a second range closer to the UI device than the first range,
    wherein the first and second rule sets each define conditions for illumination and styles of illumination that correspond to the conditions.

23. The UI device of claim 22, wherein at least one of the first rule set and the second rule set is based on data obtained from sensors in the premises management system.

* * * * *